United States Patent Office 3,353,911
Patented Nov. 21, 1967

3,353,911
PROCESS FOR REMOVING HYDROGEN FLUORIDE FROM A GASEOUS MIXTURE CONTAINING HYDROGEN FLUORIDE AND HYDROGEN CHLORIDE
Leopold Moller and John Lionel Pegler, Avonmouth, Bristol, England, assignors to Imperial Smelting Corporation (N.S.C.) Limited, London, England, a British company
No Drawing. Filed Oct. 11, 1966, Ser. No. 585,740
3 Claims. (Cl. 23—149)

ABSTRACT OF THE DISCLOSURE

Gaseous hydrogen fluoride is removed from gas mixtures containing hydrogen fluoride and hydrogen chloride by bringing the gases into contact with an aqueous absorbent solution of boric acid saturated with hydrogen chloride from the gaseous mixture.

---

This application is a continuation-in-part of our pending application Ser. No. 418,860, filed Dec. 16, 1964, for improvements in or relating to the Separation of Hydrogen Fluoride and Hydrogen Chloride Mixtures (since abandoned).

This invention relates to a method of removing gaseous hydrogen fluoride from gas mixtures containing hydrogen fluoride and hydrogen chloride.

Prior art

It is known that hydrogen fluoride can be removed from hydrogen chloride gases by first passing the gases through a glass wool or other siliceous material to convert the HF into $SiF_4$ and then contacting the $SiF_4$ with solid boric acid. Very nearly complete removal of HF from the gases is claimed.

Brief summary of the invention

Our invention consists in a method for the removal of gaseous hydrogen fluoride from a gas mixture containing hydrogen chloride and hydrogen fluoride, in which the mixture is contacted with an aqueous solution of boric acid containing hydrogen chloride in sufficient quantity that the pressure of this hydrogen chloride is equal to the partial pressure of the hydrogen chloride in the gas stream.

Detailed description of the invention

The separation may be carried out by passing a gaseous mixture containing hydrogen fluoride and hydrogen chloride, e.g. a mixture of products resulting from the fluorination reaction:

$$CCl_4 + 2HF = CCl_2F_2 + 2HCl$$

through a suitable gas liquid contacting device, such as a packed tower irrigated with an aqueous solution of boric acid in hydrochloric acid.

With such an aqueous boric acid solution containing 5–10% w./w. HF with a fluorine:boron atomic ratio of between 2:1 and 4:1, and saturated with HCl at a partial pressure of ca. 0.5 atm., it is possible to reduce the HF content of HF/HCl gas mixtures to the equivalent of 0.01% w./w. HF in 30% w./w. hydrochloric acid.

The range of F:B atomic ratios permissible in the boric acid solution is determined by the following considerations. The upper limit of 4:1 obviously cannot be exceeded since the mechanism of the removal reaction:

$$4HF + H_3BO_3 \rightarrow HBF_4 + 3H_2O$$

will not allow it.

Results obtained from runs carried out on HF and HCl containing gas mixtures are tabulated below:

| | Absorber solution, $H_3BO_3$/HF/HCl | | | | | | Gas Composition, Mole ratio, HCl:HF | |
|---|---|---|---|---|---|---|---|---|
| | Original, percent w./w. | | Mole ratio | Final, percent w./w. by analysis | | | | |
| | HF | $H_3BO_3$ | F:B | HF | $H_3BO_3$ | HCl | Inlet | Outlet |
| 1 | 6.0 | 5.83 | 3.2:1 | 6.2 | 5.4 | 33.1 | 83:1 | 4,831:1 |
| 2 | 1.68 | 2.64 | 2.0:1 | 2.05 | 2.49 | 36.3 | 36:1 | 1,839:1 |
| 3 | 5.0 | 7.98 | 1.9:1 | 5.2 | 7.4 | 33.0 | 30:1 | 8,700:1 |
| 4 | 5.0 | 4.46 | 3.5:1 | 5.3 | 4.8 | 33.7 | 36:1 | 4,770:1 |
| 5 | 7.5 | 7.75 | 3.0:1 | 7.4 | 7.1 | 32.3 | 32:1 | 4,350:1 |
| 6 | 7.5 | 10.4 | 2.2:1 | 7.5 | 9.5 | 31.3 | 62:1 | 4,900:1 |
| 7 | 10.0 | 10.4 | 3.0:1 | 9.6 | 9.5 | 29.8 | 145:1 | 6,400:1 |
| 8 | 10.0 | 15.0 | 2.1:1 | 9.7 | 13.9 | 28.0 | 81:1 | 1,600:1 |
| 9 | 7.5 | 6.55 | 3.5:1 | 6.8 | 6.2 | 32.8 | 70:1 | 3,310:1 |
| 10 | 10.0 | 9.76 | 3.2:1 | 9.7 | 8.8 | 30.5 | 92:1 | 3,140:1 |
| 11 | 15.0 | 11.8 | 3.9:1 | 14.2 | 10.6 | 26.0 | 46:1 | 1,590:1 |

From these results it can be seen that the absorption of HF in the $H_3BO_3$ can be continued until the molal F:B ratio has risen nearly to 4 (corresponding to the composition of $HBF_4$).

As is well known, commercial boric acid, indicated generally at $H_3BO_3$, is not pure. Other boric acids may be present, also produced from boric oxide, $B_2O_3$, with varying amounts of water. See 2 Encyclopedia of Chemical Technology 602 (1948). This is true also of fluoboric acid, indicated generally as $HBF_4$, and often called tetra fluoboric acid or borofluoric acid. Other fluoboric acids may be present, also produced by dissolving boric acid in hydrofluoric acid, usually indicated by such reactions as:

$$H_3BO_3 + 4HF \rightarrow HBF_3 + HF + 2H_2O$$

$$HBF_3OH + HF \rightleftharpoons HBF_4 + H_2O$$

See 6 Encyclopedia of Chemical Technology 684–6 (1951). In other words, other fluoboric acids, such as $HBF_3(OH)$ and $HBF_2(OH_2)$, are known and may be present; the so-called fluoboric acid is not necessarily present solely as pure $HBF_4$.

It is our understanding (1) that the reaction between $H_3BO_3$ and HF proceeds by stages, e.g.

$$H_3BO_3 + HF \rightleftharpoons HBF(OH)_3$$

$$HBF(OH)_3 + HF \rightleftharpoons HBF_2(OH)_2$$

$$HBF_2(OH)_2 + HF \rightleftharpoons HBF_3(OH)$$

$$HBF_3(OH) + HF \rightleftharpoons HBF_4$$

(2) that the existence of $HBF_2(OH)_2$ and $HBF_3(OH)$ has been confirmed; but (3) that the existence of HBF(OH)$_3$ is purely speculative; and that it is therefore to be expected that the solution of HF, H$_3$BO$_3$ and HCl will contain a mixture of fluoboric and hydroxyfluoboric acids, boric acid and hydrochloric acid.

Various modifications may be made within the scope of the invention.

What we claim is:

1. In the method of removing gaseous hydrogen fluoride from a gaseous mixture containing hydrogen chloride and hydrogen fluoride, the improvement which comprises bringing a mixture of the gases containing a major proportion of hydrogen chloride and a minor proportion of hydrogen fluoride into intimate contact with an aqueous absorbent solution of boric acid, said boric acid solution being saturated with hydrogen chloride from the gaseous mixture to inhibit absorption of hydrogen chloride from the gaseous mixture, and maintaining the partial pressure of the hydrogen chloride in the boric acid solution equal to the partial pressure of the hydrogen chloride in the gaseous mixture to facilitate absorption of the hydrogen fluoride from the gaseous mixture into the boric acid solution to form an aqueous solution of fluoboric acid.

2. Method according to claim 1, in which the aqueous boric acid absorbing solution contains a fluorine to boron atomic ratio of between 2:1 and 4:1.

3. Method according to claim 1, in which the aqueous boric acid absorbing solution contains a fluorine to boron atomic ratio of between 2:1 and 4:1, and is saturated with HCl at a partial pressure of about 0.5 atm.

References Cited

UNITED STATES PATENTS

| 2,343,462 | 3/1944 | Laird et al. | 23—154 |
| 3,016,285 | 1/1962 | Clifford | 23—153 |

FOREIGN PATENTS

| 1,036,826 | 8/1958 | Germany. | |

OSCAR R. VERTIZ, *Primary Examiner.*

E. STERN, *Assistant Examiner.*

UNITED STATES PATENT OFFICE

CERTIFICATE OF CORRECTION

Patent No. 3,353,911                                        November 21, 1967

Leopold Moller et al.

It is certified that error appears in the above identified patent and that said Letters Patent are hereby corrected as shown below:

Columns 1 and 2, in the table, eight column, line 8 thereof, for "81:1" read -- 82:1 --; same table, ninth column, line 1 thereof, for "4,831:1" read -- 4,830:1 --; column 2, line 45, for "at" read -- as --; line 54, for "$HBF_3$" read -- $HBF_3OH$ --.

Signed and sealed this 22nd day of July 1969.

(SEAL)
Attest:

Edward M. Fletcher, Jr.                                 WILLIAM E. SCHUYLER, JR.
Attesting Officer                                                  Commissioner of Patents